United States Patent [19]

Suzuki

[11] Patent Number: 5,755,638
[45] Date of Patent: May 26, 1998

[54] LOCK-UP APPARATUS CONTROLLING TIMING OF INITIATION OF LOCK-UP CLUTCH OPERATION

[75] Inventor: Hideo Suzuki, Fuji, Japan

[73] Assignee: JATCO Corporation, Japan

[21] Appl. No.: 736,738

[22] Filed: Oct. 25, 1996

[30] Foreign Application Priority Data

Oct. 26, 1995 [JP] Japan ................................. 7-302009

[51] Int. Cl.$^6$ ................................................. F16H 61/14
[52] U.S. Cl. .............................. 477/62; 477/174; 192/3.3
[58] Field of Search .......................... 477/62, 166, 174, 477/168, 175; 192/3.3, 3.31

[56] References Cited

U.S. PATENT DOCUMENTS

| | | | |
|---|---|---|---|
| 4,819,777 | 4/1989 | Yasue et al. | 477/73 |
| 5,082,095 | 1/1992 | Imamura | 192/3.3 |
| 5,160,002 | 11/1992 | Suzuki | 192/3.31 |
| 5,332,073 | 7/1994 | Iizuka | 477/174 |

*Primary Examiner*—Charles A. Marmor
*Assistant Examiner*—Sherry Lynn Estremsky
*Attorney, Agent, or Firm*—Rossi & Associates

[57] ABSTRACT

A lock-up apparatus is provided which includes: a lock-up clutch that divides an interior of a hydraulic power transmitting device into an apply chamber and a release chamber and operating according to a pressure difference between the apply chamber and the release chamber; a lock-up solenoid that generates a control oil pressure that varies with a duty ratio of a power pulse signal supplied thereto; and a pressure regulating valve that selectively supplies or discharge oil to or from the apply chamber and the release chamber, through first and second oil paths, respectively, with an oil pressure of the second oil path being applied against the control oil pressure, so as to regulate the oil pressure of the second oil path. The lock-up apparatus further includes a control device that starts changing the duty ratio from an initial value at a rate of change in response to a command to start engagement of the lock-up clutch, thereby to control an engaging process of the lock-up clutch. The control device controls the initial value and/or the rate of change according to a pressure level of the oil supplied to the second oil path in response to the command to start engagement of the lock-up clutch, so as to substantially fix a period of time measured from a point of time when the control oil pressure starts being changed until a point of time when the pressure regulating valve starts operating.

3 Claims, 6 Drawing Sheets

LOCK-UP APPARATUS CONTROLLING TIMING OF INITIATION OF LOCK-UP CLUTCH OPERATION

BACKGROUND OF THE INVENTION

1. Field of the Invention

The present invention relates to a lock-up device that directly connects the driving and driven sides of a hydraulic power transmitting device attached to an automatic transmission.

2. Description of the Prior Art

An automatic transmission provided with a hydraulic power transmitting device, such as a fluid coupling or torque converter, has been put in practical use. The hydraulic power transmitting device is attached to the input side of a gear shifting mechanism of the transmission where the gear ratio is mechanically changed. Since the hydraulic power transmitting device utilizes flow of oil to transmit the drive force, slips inevitably occur between the driving and driven sides of the device, resulting in loss of the power transmission.

An example of a lock-up clutch incorporated in a torque converter and its hydraulic control mechanism are disclosed in Japanese Patent Application Laid-open No. 63-172058.

The disclosed lock-up clutch divides the interior of the torque converter into an apply chamber and a release chamber, and operates according to a difference in the pressure between the apply chamber and the release chamber. The hydraulic control mechanism includes a lock-up solenoid that generates a control oil pressure that varies with the duty ratio of a power pulse signal supplied thereto, and a pressure regulating valve for switching supply (connecting with a line pressure) and discharge (connecting with a drain) of the oil with respect to a first oil path connected to the apply chamber and a second oil path connected to the release chamber. This pressure regulating valve is operated according to the above control oil pressure with the oil pressure of the second oil path being applied against the control oil pressure.

Once an automatic transmission control unit adapted to control the automatic transmission determines that the lock-up clutch is to be engaged, the control unit changes the duty ratio of the power pulse signal from zero at a given ratio of change, so as to control the engaging process of the lock-up clutch.

Where a fixed initial value is set for the duty ratio of the ON-OFF state of the lock-up solenoid, and the duty ratio is changed from the initial value at a constant rate of change in the hydraulic control mechanism of the lock-up clutch disclosed in Japanese Patent Application Laid-open No. 63-172058, a sense of incompatibility may arise during driving of the vehicle upon changes of driving conditions.

For example, if the duty ratio is set at a fixed initial value when the lock-up clutch is determined to be engaged with the vehicle speed exceeding a predetermined threshold, and the duty ratio is gradually increased from the initial value at a given rate of change to continuously lower the control oil pressure, there arises a variation in a period of time from the time when the engagement of the lock-up clutch is determined to the time when the pressure regulating valve actually starts operating.

Namely, since the control oil pressure is continuously lowered with the oil pressure supplied to the torque converter being applied against the control oil pressure, the pressure regulating valve immediately starts operating upon slight reduction of the control oil pressure if the oil pressure supplied to the torque converter is high. If the oil pressure supplied to the torque converter is low, however, the pressure regulating valve does not start operating until the control oil pressure is considerably lowered. The oil pressure supplied to the torque converter is controlled according to the throttle opening, so as to assure a sufficient engaging power for the lock-up clutch, and is set at a higher level when the throttle opening is large, than a level set when the throttle opening is small.

When the throttle opening is small, therefore, it takes a prolonged or extended time from determination of engagement of the lock-up clutch up to start of actual operation of the pressure regulating valve, and reduction of the engine speed that entails the engagement of the lock-up clutch is also delayed.

SUMMARY OF THE INVENTION

The object of the present invention is to provide a lock-up apparatus which performs hydraulic control for setting an initial value for the duty ratio of the ON-OFF state of a lock-up solenoid, and gradually changing the duty ratio from this initial value, and wherein the timing of initiating the lock-up operation is made constant or stable so as not to cause a sense of incompatibility.

The above object may be accomplished according to the principle of the present invention, which provides a lock-up apparatus comprising: a lock-up clutch disposed in a hydraulic power transmitting device, for dividing an interior thereof into an apply chamber and a release chamber and operating according to a pressure difference between the apply chamber and the release chamber; a lock-up solenoid that generates a control oil pressure that varies with a duty ratio of a power pulse signal supplied thereto; a pressure regulating valve connected to the apply chamber through a first oil path and to the release chamber through a second oil path, for selectively supplying oil to one of the apply chamber and the release chamber and discharging the oil from the other of the apply chamber and the release chamber, through the first and second oil paths, respectively, with an oil pressure of the second oil path being applied against the control oil pressure, so as to regulate the oil pressure of the second oil path; and a control device that starts changing the duty ratio from an initial value at a rate of change in response to a command to start engagement of the lock-up clutch, thereby to control an engaging process of the lock-up clutch; wherein the control device controls at least one of the initial value and the rate of change according to a pressure level of the oil supplied to the second oil path in response to the command to start engagement of the lock-up clutch, so as to substantially fix a period of time measured from a point of time when the control oil pressure starts being changed until a point of time when the pressure regulating valve starts operating.

In the lock-up apparatus as described above, at least one of the initial value and rate of change of the duty ratio is adjusted or selected in view of the balance between the oil pressure of the second oil path and the control oil pressure that are applied against each other in the pressure regulating valve. Thus, even if the oil pressure level in the second oil path differs when the lock-up clutch is determined to be engaged, the pressure regulating valve begins to be operated a substantially fixed time after start of continuous changes of the control oil pressure. The pressure regulating valve does not start operating until the control oil pressure exceeds the oil pressure of the second oil path in the valve, even after the control oil pressure begins to be continuously changed.

Thus, the initial value and the rate of change that permits the pressure regulating valve to start operating a substantially fixed time after the start of continuous changes of the control oil pressure can be selected according to the oil pressure of the second oil path when the lock-up clutch is determined to be engaged. In other words, the time from generation of the command to engage the lock-up clutch to actual start of the engagement of the lock-up clutch is substantially fixed, irrespective of the level of the oil pressure supplied to the release chamber when the lock-up command is generated, whereby no sense of incompatibility arises due to too early or late start of engagement of the lock-up clutch.

Where the initial value is set at different values while the rate of change is set at a constant value, the rate of increase in the engaging pressure of the lock-up clutch is made constant or fixed, with a result of no change in the engaging time of the lock-up clutch.

In the hydraulic control of the lock-up clutch disclosed in Japanese Patent Application Laid-open No. 63-172058, the duty ratio is continuously increased from 0 to 1, that is, the duty ratio is not increased from its initial value.

Although the time required to engage the lock-up clutch is controlled to be constant by adjusting the rate of change of the control oil pressure according to the throttle opening, this results in a large variation in the period of time from determination of engagement of the lock-up clutch to actual starting of the engagement depending upon the rate of change of the control oil pressure. Since the oil pressure supplied to the hydraulic power transmitting device is fixed, the level of the control oil pressure that starts operating the pressure regulating valve is always fixed or made constant. If the rate of change is increased, therefore, the period of time from start of reduction of the control oil pressure to start of operation of the pressure regulating valve is shortened, and, if the rate of change is reduced, the start of the operation of the pressure regulating valve is delayed. With the pressure supplied to the fluid power transmitting device being constant, there is no possibility that a variation arises in the time from start of continuous changes of the control oil pressure to start of the operation of the pressure regulating valve due to changes of the oil pressure supplied to the hydraulic power transmitting device.

An appropriate rate of change is selected so as to fix the period of time from start of operation of the pressure regulating valve to completion of the operation, but not the time from start of continuous changes of the control oil pressure to start of the operation of the pressure regulating valve. Accordingly, the selected values of rate of change naturally differ in both controls.

In the lock-up apparatus as described above, the pressure level of the oil supplied to the second oil path in response to the command to start engagement of said lock-up clutch may be increased with an increase in a throttle opening of a throttle valve, and the control device may control at least one of the initial value and the rate of change of the duty ratio depending upon the throttle opening.

In this arrangement, the oil pressure level of the second oil path upon determination of engagement of the lock-up clutch corresponds to the throttle opening, thus enabling the oil pressure level of the second oil path to be detected by measuring the throttle opening. Thus, one or both of the initial value and the rate of change of the control oil pressure is/are increased with an increase of the throttle opening, so as to maintain a fixed period of time from start of continuous changes of the control oil pressure to start of the operation of the pressure regulating valve.

Thus, the time from generation of the lock-up command to the actual start of the engagement of the lock-up clutch is controlled to be almost fixed irrespective of the degree of the throttle opening. In the case where the throttle opening is small, therefore, there is no delay in starting the engagement of the lock-up clutch as compared with the case where the throttle opening is large, thus causing no sense of incompatibility during driving of the vehicle.

In the lock-up apparatus as described above, the initial value may be fixed while the rate of change of the duty ratio may be selected depending upon the throttle opening, and the control device sets the rate of change of the duty ratio at a constant value irrespective of the throttle opening when the lock-up clutch starts being partially engaged.

In the above arrangement, the rate of change of the duty ratio is fixed once the lock-up clutch is partially engaged, and the duration during which the lock-up clutch is kept partially engaged is made almost constant irrespective of the degree of the throttle opening, assuring repeatability of the process of partial engagement of the lock-up clutch. In the case where the throttle opening is small, therefore, there is no delay in completing engagement of the lock-up clutch, thus causing no sense of incompatibility during driving of the vehicle. Excessive wear of engaged faces of the lock-up clutch can be avoided where the throttle opening is large.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

Figure 1:
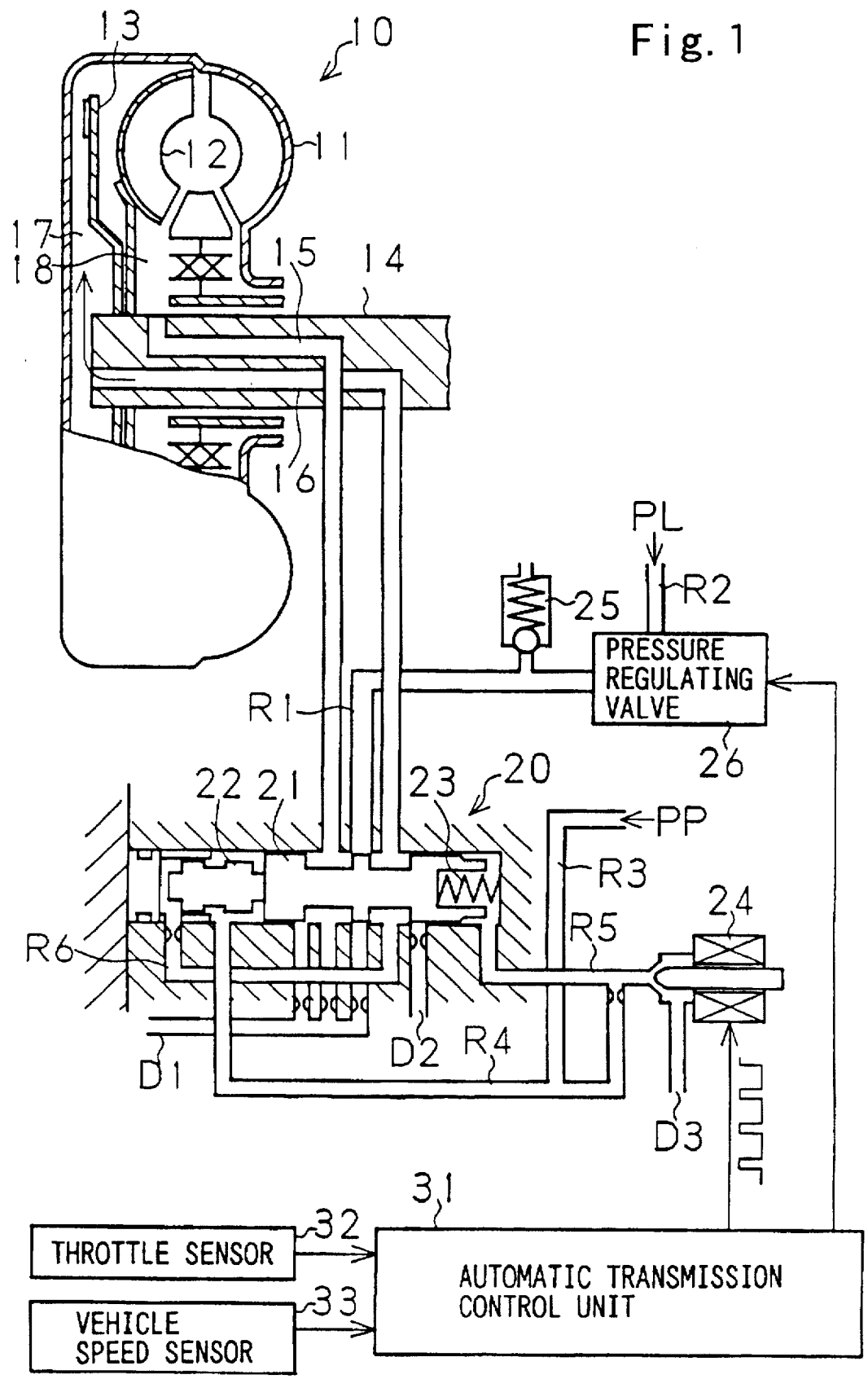
FIG. 1 is a view explaining a control mechanism for a lock-up clutch according to the first embodiment of the present invention.
Figure 2:
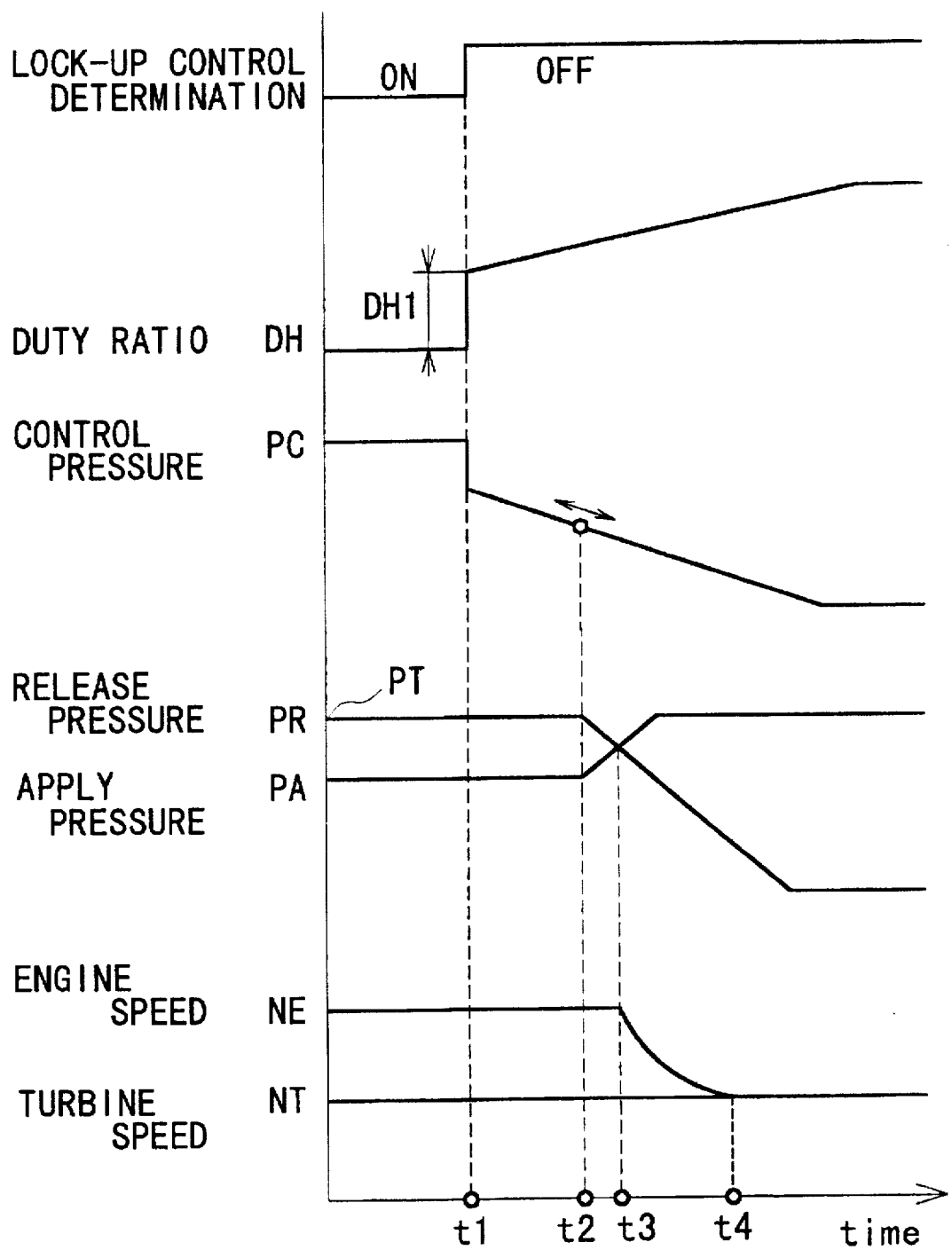
FIG. 2 is a time chart used in the lock-up control of the first embodiment.
Figure 3:
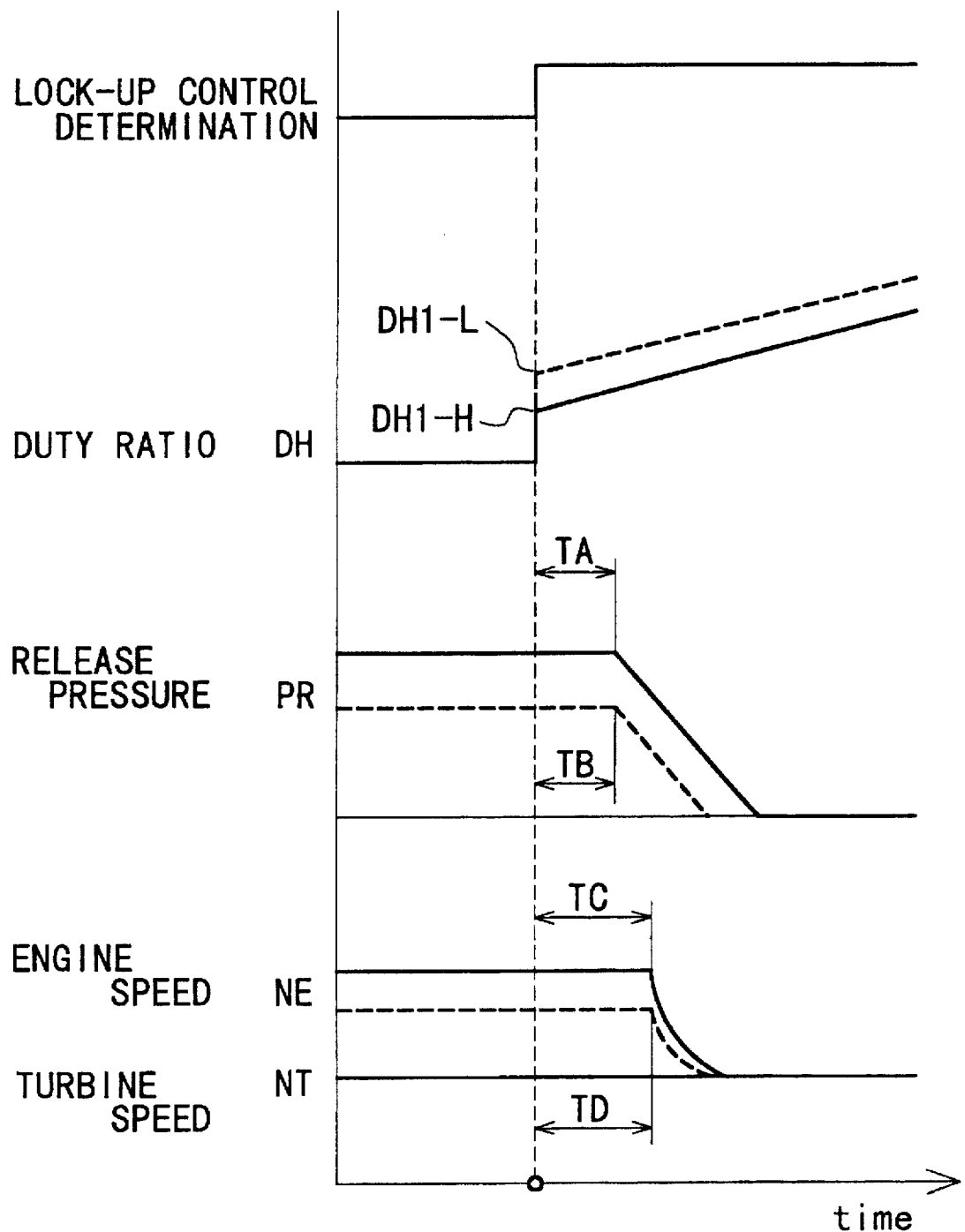
FIG. 3 is a time chart used in the lock-up control of the first embodiment.
Figure 4:
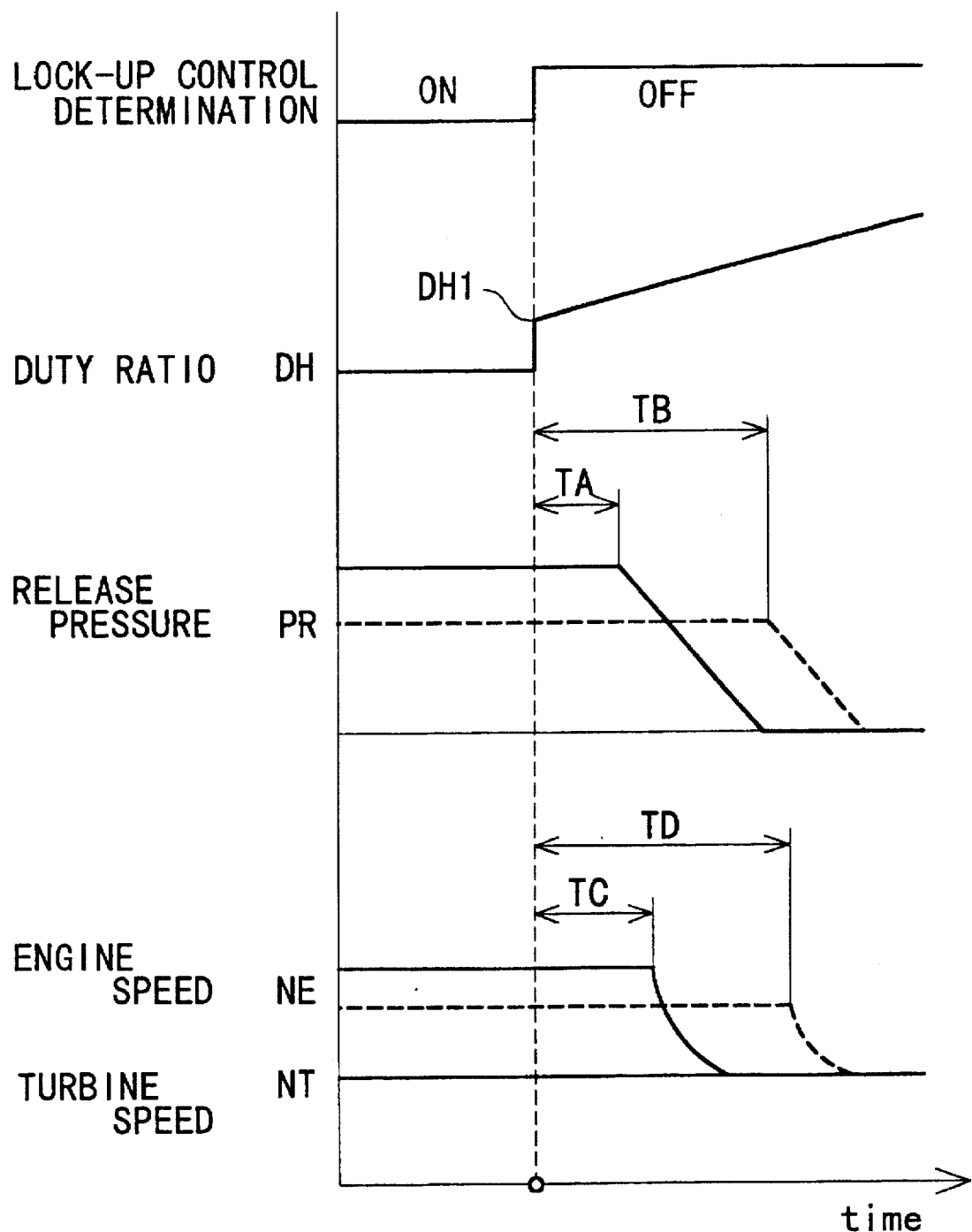
FIG. 4 is a time chart used in lock-up control of a comparative example.
Figure 5:
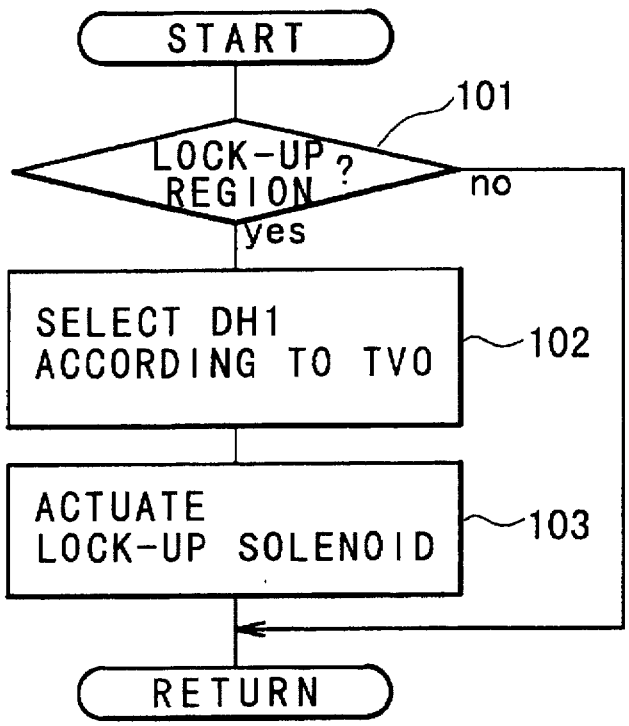
FIG. 5 is a flow chart showing a routine of the lock-up control of the first embodiment.
Figure 6:
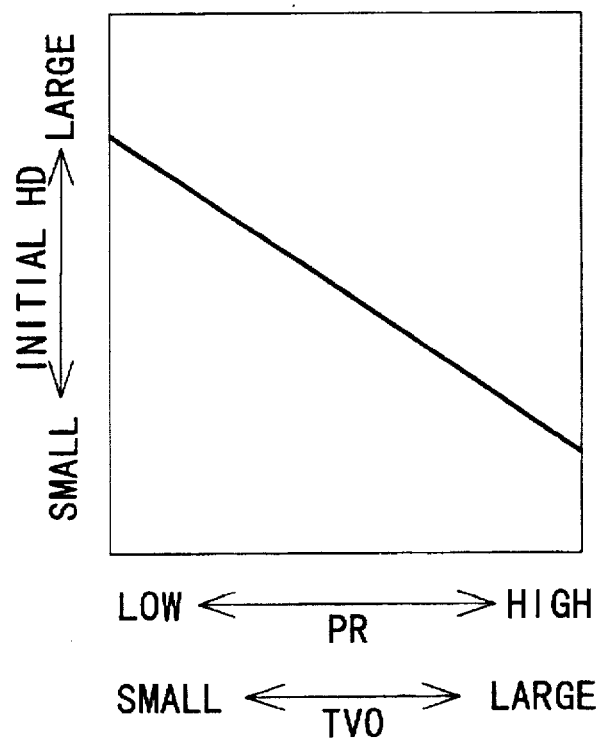
FIG. 6 is a graph indicating the initial value of the duty ratio.

Referring first to FIGS. 1 through 6, there will be described lock-up control according to the first embodiment of the present invention. FIG. 1 is a view explaining a control mechanism for a lock-up clutch, and FIGS. 2 and 3 are time charts used in the lock-up control of the first embodiment, while FIG. 4 is a time chart used in lock-up control of a comparative example. FIG. 5 is a flow chart showing the lock-up control routine, and FIG. 6 is a graph indicating the initial value of the duty ratio.

As shown in FIG. 1, torque converter 10 transmits the torque of an engine received by a cover 11 to a turbine shaft 14 through a turbine runner 12. The interior space of the cover 11 is filled with oil, and the power of the engine is transmitted through the flow of the oil between a pump impeller provided inside the cover 11, and the turbine runner 12.

Lock-up clutch 13 capable of directly connecting the rotating cover 11 and turbine shaft 14 is provided within the torque converter 10.

The lock-up clutch 13 is disposed to divide the interior space of the torque converter 10 into a release chamber 17 and an apply chamber 18. This lock-up clutch 13 is rotated with the turbine shaft 14, and is movable in the axial direction of the shaft 14. In the lock-up state, the lock-up clutch 13 is moved toward the release chamber 17 to be thereby pushed against the inner wall of the cover 11 for frictional movement with the cover 11.

The lock-up clutch 13 is moved toward the apply chamber 18 if an oil pressure PT is supplied to the release chamber 17 through a second oil path 16, and oil is discharged from the apply chamber 18 through a first oil path 15. The lock-up clutch 13 is moved toward the release chamber 17 to be pushed against the inner wall of the cover 11 if the oil pressure PT is supplied to the apply chamber 18 through the first oil path 15, and oil is discharged from the release chamber 17 through the second path 16.

While the first and second oil paths 15, 16 are disposed in parallel with each other within the turbine shaft 14 in FIG. 1, the second oil path 16 may be formed through the center of the turbine shaft 14, and the first oil path 15 may be in the form of a cylindrical clearance between the surface of the turbine shaft 14 and a sleeve-like shaft that surrounds the turbine shaft 14.

The supply and discharge of the oil to and from the release chamber 17 and apply chamber 18 through the first oil path 15 and the second oil path 16 is switched depending upon the operation of a pressure regulating valve 20 for regulating the pressure in the release chamber 17. The oil, whose pressure has been changed from the line pressure PL of an oil path R2 into the oil pressure PT by means of a pressure regulating valve 26, flows into the pressure regulating valve 20 through the oil path R1, and then supplied to the torque converter 10 through the pressure regulating valve 20 so as to actuate the lock-up clutch 13.

Regulating valve 25 sets a limit to the oil pressure PT by discharging the oil when an excessive oil pressure PT arises in the oil path R1.

When spool 21 and plug 22 of the pressure regulating valve 20 are located at the right end of the valve 20 as viewed in FIG. 1, the oil path R1 communicates with the first oil path 15 so that the oil pressure PT is supplied to the first oil path 15 through the valve 20, while the second oil path 16 is connected to a drain D2. As a result, the lock-up clutch 13 is moved toward the release chamber 17 to be pushed against the inner wall of the cover 11 so that the clutch 13 is placed in a lock-up state.

When the spool and plug 22 of the pressure regulating valve 20 are located at the left end of the valve 20 as viewed in FIG. 1, the oil path R1 communicates with the second oil path 16 so that the oil pressure PT is supplied to the second oil path 16 through the valve 20, while the second oil path 16 is connected to a drain D1. As a result, the lock-up clutch 13 is moved toward the apply chamber 18 to be spaced apart from the inner wall of the cover 11 so that the clutch 13 is placed in a released state.

The lock-up clutch 13 is partially engaged, or in a half-engaged state, when the spool 21 and plug 22 are in an intermediate position between the lock-up state and the released state. In this state, the oil pressure PT supplied through the oil path R1 is incompletely applied to both of the first and second oil paths 15, 16, while part of the oil in the first and second paths 15, 16 is kept discharged through the drain D1.

The position of the spool 21 and plug 22 in the pressure regulating valve 20 is controlled by the duty ratio DH of a power pulse signal supplied to a lock-up solenoid 24. The lock-up solenoid 24 controls a pilot pressure PP supplied through an oil path R3, by intermittently releasing the pilot pressure PP into a drain D3, so as to develop a control pressure PC in an oil path R5 according to the duty ratio DH of the power pulse signal.

In the released state (DH=0) where the lock-up solenoid 24 is kept in the OFF state, the control pressure PC in the oil path R5 is increased up to the pilot pressure PP.

In the lock-up state (DH=1) where the lock-up solenoid 24 is kept in the ON state, the oil path R5 is connected to the drain D3 whereby the control pressure PC is lowered close to zero.

With the power pulse signals supplied to the lock-up solenoid 24 to repeatedly switch the ON/OFF state of the solenoid 24 (1>DH>0), the control pressure PC is monotonically lowered with an increase of the duty ratio DH.

The spool 21 of the pressure regulating valve 20 is biased to the left (in FIG. 1) by means of the control pressure PC supplied through the oil path R5 and a spring 23, and is biased to the right (in FIG. 1) by means of the release oil pressure supplied to a space on the left side of the plug 22 through oil paths R6, 16, and the pilot pressure PP supplied through an oil path R4.

As the oil pressure PT supplied to the torque converter 10 increases, therefore, the spool 21 starts moving to the right (in FIG. 1) even if the control pressure PC in the oil path R5 is not lowered to a great extent. On the contrary, as the oil pressure PT decreases, the spool 21 does not start moving to the right (in FIG. 1) until the control pressure PC in the oil path R5 is lowered to a great extent.

An automatic transmission control unit 31 is adapted to synthetically control an automatic transmission equipped with the torque converter 10, with reference to output signals from a throttle sensor 32 provided in the engine, vehicle speed sensor 33 provided in the automatic transmission, and other sensors (not shown).

The automatic transmission control unit 31 obtains a current throttle opening TVO based on an output signal of the throttle sensor 32, and a current vehicle speed VSP based on an output signal of the vehicle speed sensor 33, and determines an appropriate shift timing on the basis of the throttle opening TVO and vehicle speed VSP to thus control the gear shifting operation of the transmission.

The automatic transmission control unit 31 also determines lock-up timing of the torque converter 10 on the basis of the throttle opening TVO and the vehicle speed VSP. When the lock-up control is to be executed, the control unit 31 controls the lock-up solenoid 24 so as to smoothly engage the lock-up clutch 13 through a half-engaged state.

The automatic transmission control unit 31 regulates oil pressures supplied to various engaging elements of the automatic transmission, and also controls the pressure regulating valve 26 so as to regulate the oil pressure PT supplied to the torque converter 10 according to the throttle opening TVO. Since an engagement load of the lock-up clutch 13 is increased with an increase in the throttle opening TVO, the oil pressure PT is increased so as to increase an engagement capacity of the lock-up clutch 13.

As shown in FIG. 2, the automatic transmission control unit 31 sets the duty ratio DH of the power pulse signal supplied to the lock-up solenoid 24 at an initial value DH1 at the same time that the lock-up control is determined to be executed at time "t1", and immediately increase the duty ratio DH from the initial value DH1 at a predetermined rate of change.

If the initial value DH1 is not used and the duty ratio DH is increased from zero as disclosed in Japanese Patent Application Laid-open No. 63-172058, the spool 21 of the pressure regulating valve 20 begins to be operated a prolonged time after the lock-up control is determined to be executed.

When the control pressure PC is lowered with an increase in the duty ratio DH until the spool 21 of the pressure regulating valve 20 starts moving at time "t2", the pressure (hereinafter referred to as release pressure) in the release chamber 17 begins to be lowered, and the pressure (hereinafter referred to as apply pressure) in the apply chamber 18 begins to be increased. The lock-up clutch 13 then starts being engaged at time "t3" when the release pressure PR coincides with the apply pressure PA, and thereafter the engaging pressure applied to the lock-up clutch 13 is increased with an increase in a difference between the apply pressure PA and the release pressure PR. At the same time, the engine speed NE is rapidly lowered, and engagement of the lock-up clutch 13 is completed at time "t4" when the engine speed NE coincides with the turbine speed NT.

As shown in FIG. 3, the automatic transmission control unit 31 changes the initial value DH1 according to the throttle opening TVO, so as to reduce a variation in the period of time between "t1" and "t2" even with changes in the oil pressure PT supplied to the torque converter 10. This period of time starts with initiation of the lock-up control and terminates when the spool 21 of the pressure regulating valve 20 begins to be moved.

Since the oil pressure PT that pushes the plug 22 of the pressure regulating valve 20 to the right is high when the throttle opening TVO is large, the spool 21 starts moving even if the control pressure PC is not lowered to a great extent. Thus, the initial value DH1-H (indicated by a solid line in FIG. 3) is set at a relatively small value so as to delay lowering the control pressure PC, namely, reduce the rate at which the control pressure PC is lowered.

Since the oil pressure PT that pushes the plug 22 of the pressure regulating valve 20 to the right is small when the throttle opening TVO is small, the spool 21 does not start moving until the control pressure PC is considerably lowered. Thus, the initial value DH1-L (indicated by a dashed line in FIG. 3) is set at a relative large value so as to accelerate reduction of the control pressure PC, namely, increase the rate at which the control pressure PC is lowered.

In sum, irrespective of the degree of the throttle opening TVO, it takes a substantially constant period of time TA, TB from the time when the lock-up control is initiated until the time when the spool 21 starts moving and the pressure PR of the release chamber begins to be lowered. Further, the engine speed NE begins to be lowered a substantially constant time TC, TD after the lock-up control is initiated.

If the same initial value DH1 is employed irrespective of the throttle opening TVO, the period of time TA from the start of the lock-up control up to the time when the pressure PR of the release chamber 17 begins to be lowered when the throttle opening TVO is large (indicated by a solid line in FIG. 4) is shorter than the corresponding period of time TB when the throttle opening TVO is small (indicated by a dashed line in FIG. 4). Also, the time TD up to a point of time when the engine speed NE starts being lowered when the throttle opening TVO is low (dashed line) becomes longer than the corresponding time TC when the throttle opening TVO is large (solid line).

Turning to FIG. 5, the lock-up control of the first embodiment will be explained.

As shown in FIG. 5, step 101 is executed to determine whether the vehicle is in a lock-up region or not, i.e., the lock-up clutch 13 is to be engaged or not, on the basis of the current throttle opening TVO and current vehicle speed VSP. If the vehicle is in the lock-up region, the control flow goes to step 102. If not, steps 102 and 103 are skipped.

In step 102, the initial value DH1 of the duty ratio DH is selected according to the current throttle opening TVO. As shown in the graph of FIG. 6, the oil pressure PT supplied to the torque converter 10 corresponds to the degree of the throttle opening TVO, and the initial value DH1 is set to different values depending upon the oil pressure PT supplied to the torque converter 10, so as to assure a constant period of time from the start of reduction of the control pressure PC up to the start of movement of the spool 21. Thus, one initial value DH1 corresponding to the current throttle opening TVO is selected from this graph.

In step 103, the actuation of the lock-up solenoid 24 is initiated with the duty ratio of the power pulse signal set to the initial value DH1, and thereafter the duty ratio DH is increased at a constant rate of change with lapse of time.

According to the lock-up control of the first embodiment, the initial value DH1 is changed according to the throttle opening TVO, so as to assure an almost constant period of time from the start of reduction of the control pressure PC to the start of movement of the spool 21 even with changes in the oil pressure PT supplied to the torque converter 10. Thus, even if the throttle opening TVO is small, the time it takes from determination of the lock-up control up to initiation of the actual lock-up operation (movement of the spool 21) is not prolonged or extended.

When the throttle opening TVO is large, the oil pressure PT supplied to the torque converter 10 is increased so as to increase the engaging capacity of the lock-up clutch 13. In a large output condition of the vehicle with such a large throttle opening TVO, therefore, the time during which the clutch 13 is partially engaged is not prolonged, thereby avoiding wear of its engaged faces.

Since the duty ratio DH of the power pulse signal supplied to the lock-up solenoid 24 is not increased from zero but from the initial value DH1, the lock-up operation can be readily initiated even if the duty ratio DH is increased at a small rate of change.

In the first embodiment, the initial value DH1 is selected depending upon the throttle opening TVO that corresponds to the oil pressure PT supplied to the torque converter 10. However, the release pressure PR may be directly detected with an oil pressure sensor provided in the oil path 16, and the initial value DH1 may be selected depending upon the detected oil pressure level.

Figure 7:
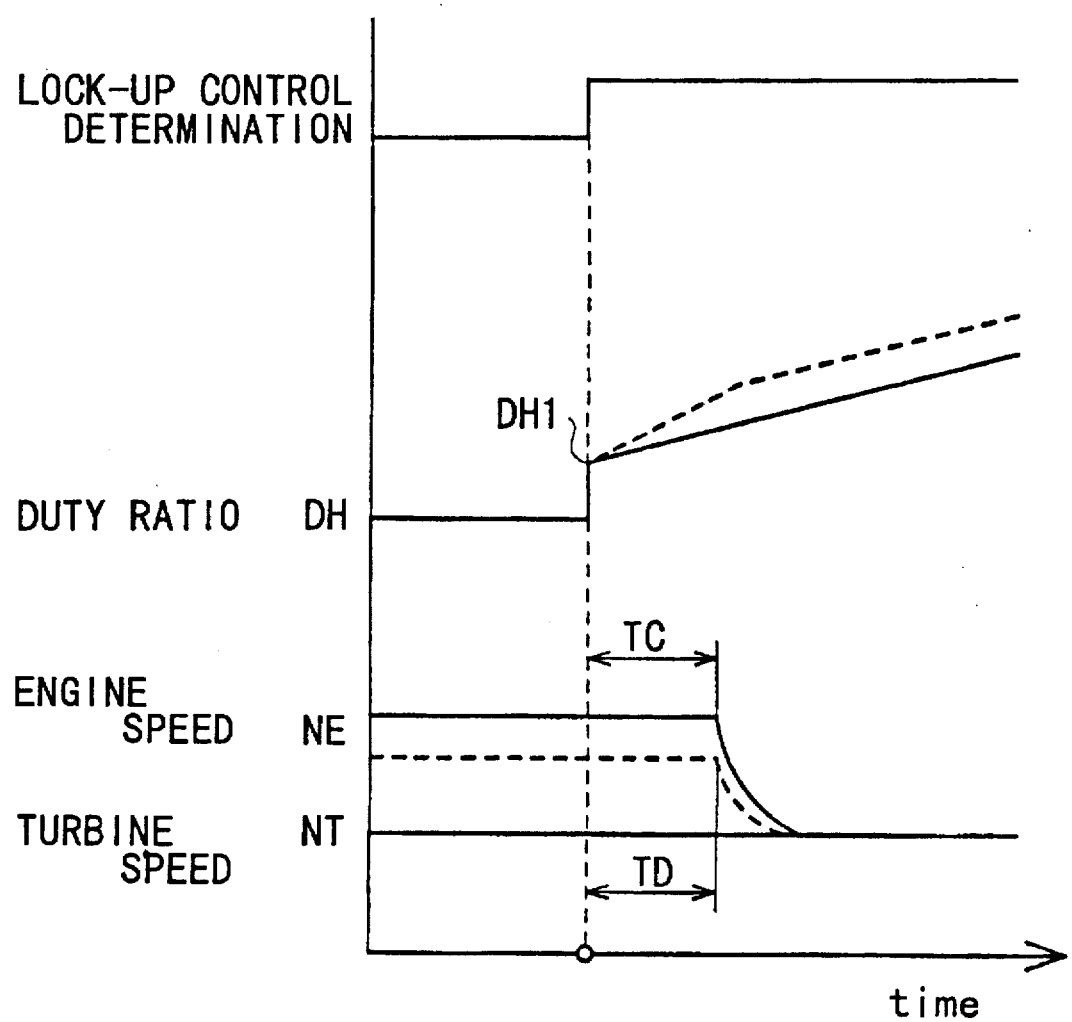
FIG. 7 is a view explaining lock-up control according to the second embodiment of the present invention.

FIG. 7 is a view explaining lock-up control according to the second embodiment of the present invention. While this embodiment uses the same control mechanism as shown in FIG. 1, it is not the initial value DH1 but the rate of increase of the duty ratio DH until the lock-up clutch 13 is partially engaged that is determined depending upon the oil pressure PT supplied to the torque converter 10.

In both of the cases where the throttle opening TVO is large as shown in solid lines in FIG. 7 and where the throttle opening TVO is small as shown in dashed lines in FIG. 7, the initial value DH1 of the duty ratio DH is set at the same value when the lock-up control is determined to be executed. After setting of the initial value DH1, however, the rate of increase of the duty ratio DH is selected according to the throttle opening TVO. Namely, a larger rate of increase of the duty ratio DH is selected when the throttle opening TVO is small, than the rate selected when the throttle opening TVO is large. In this manner, the period of time from the time when the duty ratio DH starts increasing to the time when the spool 21 starts moving is controlled to be constant or fixed irrespective of the degree of the throttle opening TVO.

If the duty ratio is increased at different rates with the lock-up clutch 13 partially engaged, the partially-engaged state lasts for different periods of time. This may undesirably cause wear of engaged faces of the lock-up clutch 13 when the partial engagement lasts for a prolonged period of time, or may increase shocks on the vehicle body upon full engagement of the clutch 13 when the time of partial engagement of the clutch 13 is shortened. In the second embodiment, therefore, oil pressure sensors are provided in the first and second oil paths 15, 16, respectively, and the rate of increase of the duty ratio DH is fixed after the pressure PR of the release chamber 17 coincides with the pressure PA of the apply chamber 18 as shown in FIG. 2, so that the lock-up clutch 13 is kept partially engaged for a predetermined period of time.

According to the lock-up control of the second embodiment, the rate of increase of the duty ratio DH up to the start of partial engagement of the lock-up clutch 13 is varied depending upon the throttle opening TVO, so that the time from the start of reduction of the control pressure PC to the start of movement of the spool 21 is made substantially constant even with changes in the oil pressure PT supplied to the torque converter 10. Thus, even if the throttle opening TVO is small, the time it takes from determination of the lock-up control up to initiation of the actual lock-up operation is not prolonged or extended. Further, after the clutch 13 starts being partially engaged, the rate of increase of the duty ratio DH is fixed irrespective of the degree of the throttle opening TVO. When the throttle opening TVO is large, therefore, the lock-up operation can be stably completed within such a short time as in the case where the throttle opening TVO is small, thus avoiding wear of the engaged faces of the lock-up clutch 13.

What is claimed is:

1. A lock-up apparatus comprising:

a lock-up clutch disposed in a hydraulic power transmitting device, for dividing an interior thereof into an apply chamber and a release chamber and operating according to a pressure difference between the apply chamber and the release chamber;

a lock-up solenoid that generates a control oil pressure that varies with a duty ratio of a power pulse signal supplied thereto;

a pressure regulating valve connected to said apply chamber through a first oil path and to said release chamber through a second oil path, for selectively supplying oil to one of the apply chamber and the release chamber and discharging the oil from the other of the apply chamber and the release chamber, through the first and second oil paths, respectively, with an oil pressure of the second oil path being applied against said control oil pressure, so as to regulate the oil pressure of the second oil path; and a control device that starts changing said duty ratio from an initial value at a rate of change in response to a command to start engagement of said lock-up clutch, thereby to control an engaging process of the lock-up clutch; wherein said control device controls at least one of said initial value and said rate of change according to a pressure level of the oil supplied to said second oil path in response to said command to start engagement of said lock-up clutch, so as to substantially fix a period of time measured from a point of time when said control oil pressure starts being changed until a point of time when said pressure regulating valve starts operating.

2. A lock-up apparatus as defined in claim 1, wherein said pressure level of the oil supplied to said second oil path in response to said command to start engagement of said lock-up clutch is increased with an increase in a throttle opening of a throttle valve, and wherein said control device controls at least one of said initial value and said rate of change of said duty ratio depending upon said throttle opening.

3. A lock-up apparatus as defined in claim 2, wherein said initial value is fixed, and said rate of change of said duty ratio is selected depending upon said throttle opening, and wherein said control device sets said rate of change of the duty ratio at a constant value irrespective of said throttle opening when said lock-up clutch starts being partially engaged.

* * * * *